United States Patent
Paveza et al.

(10) Patent No.: US 9,424,163 B2
(45) Date of Patent: Aug. 23, 2016

(54) EXCEPTION AND DEBUGGING BEHAVIORS FOR JAVASCRIPT DEBUGGING USING JUST MY CODE

(71) Applicant: Microsoft Corporation, Redmond, WA (US)

(72) Inventors: Robert A. Paveza, Redmond, WA (US); Patrick Nelson, Redmond, WA (US); Samuel Ng, Bellevue, WA (US); Gregg B. Miskelly, Seattle, WA (US); Gearard Boland, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/155,923

(22) Filed: Jan. 15, 2014

(65) Prior Publication Data

US 2015/0199259 A1 Jul. 16, 2015

(51) Int. Cl.
*G06F 9/44* (2006.01)
*G06F 11/36* (2006.01)

(52) U.S. Cl.
CPC .......... *G06F 11/362* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 6,061,518 A * | 5/2000 | Hoffman | 717/124 |
| 7,401,323 B2 | 7/2008 | Stall et al. | |
| 7,882,492 B2 | 2/2011 | Viswanadha et al. | |
| 8,225,286 B2 | 7/2012 | Stall et al. | |
| 2004/0210876 A1* | 10/2004 | Stall et al. | 717/127 |
| 2009/0260022 A1* | 10/2009 | Louch et al. | 719/328 |
| 2010/0235815 A1 | 9/2010 | Maybee et al. | |
| 2011/0107307 A1* | 5/2011 | Liu et al. | 717/125 |
| 2013/0290786 A1* | 10/2013 | Artzi | G06F 11/3676 714/32 |
| 2013/0311973 A1* | 11/2013 | Rice | G06F 11/3664 717/124 |
| 2014/0013306 A1* | 1/2014 | Gounares et al. | 717/124 |

FOREIGN PATENT DOCUMENTS

CN 104375940 A * 2/2015

OTHER PUBLICATIONS

"Using the F12 Developer Tools to Debug JavaScript Errors", Microsoft, 2011, https://web.archive.org/web/20111228155358/http://msdn.microsoft.com/en-us/library/gg699336(v=vs.85).aspx.*

(Continued)

*Primary Examiner* — Daxin Wu
(74) *Attorney, Agent, or Firm* — Kevin Sullivan; Kate Drakos; Micky Minhas

(57) ABSTRACT

Just My Code debugging allows developers to work on problems within their own code without noise from libraries, plugins and other unrelated code. Typical debugger behaviors may be modified based upon the identification or characterization of JavaScript code as "My Code," "Library Code," or "Unrelated Code." The debugger behaviors that may be modified depending upon the code's characterization include, for example, first-chance exception handling, unhandled exception handling, the behavior of the debugger at explicit user breakpoints, the behavior when a user directs the debugger to break upon the next statement, and the behavior of the debugger when the user executes a stepping gesture. The debugger's visualizes core elements of the program state, such as the call stack, depending upon the identification or characterization of the code.

20 Claims, 4 Drawing Sheets

(56) References Cited

OTHER PUBLICATIONS

"Tips and Tricks: Ignoring library code while debugging in Chrome", Internet article, Sep. 5, 2013, Collin Miller.*

Jay, "[VS2010] On the Impacts of Debugging with "Just My Code"", Published on: Jul. 5, 2010, Available at: http://www.jaylee.org/post/2010/07/05/VS2010-On-the-Impacts-of-Debugging-with-Just-My-Code.aspx.

MSDN, "How to: Step Into Just My Code", Published on: Aug. 25, 2010, Available at: http://msdn.microsoft.com/en-us/library/h5e30ex%28v=vs.80%29.aspx.

Sullivan, Brad, "Visual C++ Team Blog", Published on: Jun. 26, 2013, Available at: http://blogs.msdn.com/b/vcblog/archive/2013/06/26/just-my-code-for-c-in-vs-2013.aspx.

U.S. Appl. No. 13/831,801, Khandelwal, et al., "Javascript Debugging Using Just My Code", filed Mar. 15, 2013.

* cited by examiner

EXCEPTION AND DEBUGGING BEHAVIORS FOR JAVASCRIPT DEBUGGING USING JUST MY CODE

BACKGROUND

A broad array of tools, such as libraries and plugins, are available for JAVASCRIPT and simplify development of JAVASCRIPT-based applications. Because these libraries have already been debugged and optimized, a JAVASCRIPT developer can usually assume that the libraries themselves do not have to be debugged. Additionally, many of these tools are compressed and minified so that the underlying code is obfuscated and made unreadable to the developer, which prevents JAVASCRIPT developers from further modifying or debugging these third-party libraries. Errors in a JAVASCRIPT developer's code may create errors within these libraries, which can cause confusion when debugging the code if the error appears to originate in the library code.

Unrelated or third-party code or content may also create errors in the developer's code. The developer generally cannot or does not want to modify the library or unrelated code. Instead, the developer is likely more interested in identifying only the errors that originate in his or her own code.

As JAVASCRIPT applications become more complex and the number of libraries and plugins for JAVASCRIPT increases, it is more and more difficult for application and web site developers to work on problems within their own code without noise from these libraries and plugins and from other unrelated content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Just My Code debugging allows developers to work on problems within their own code without noise from libraries, plugins and other unrelated code. Embodiments of the invention modify typical debugger behaviors based upon the identification or characterization of JAVASCRIPT code as "My Code" (e.g. user-created or developer-created code), "Library Code," or "Unrelated Code."

Debugger behaviors that may be modified depending upon the code's characterization include, for example, first-chance exception handling, unhandled exception handling, the behavior of the debugger at explicit user breakpoints, the behavior when a user directs the debugger to break upon the next statement, and the behavior of the debugger when the user executes a stepping gesture.

Embodiments also modify how a debugger visualizes core elements of the program state, such as the call stack, depending upon the identification or characterization of the code as "My Code," "Library Code," or "Unrelated Code."

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
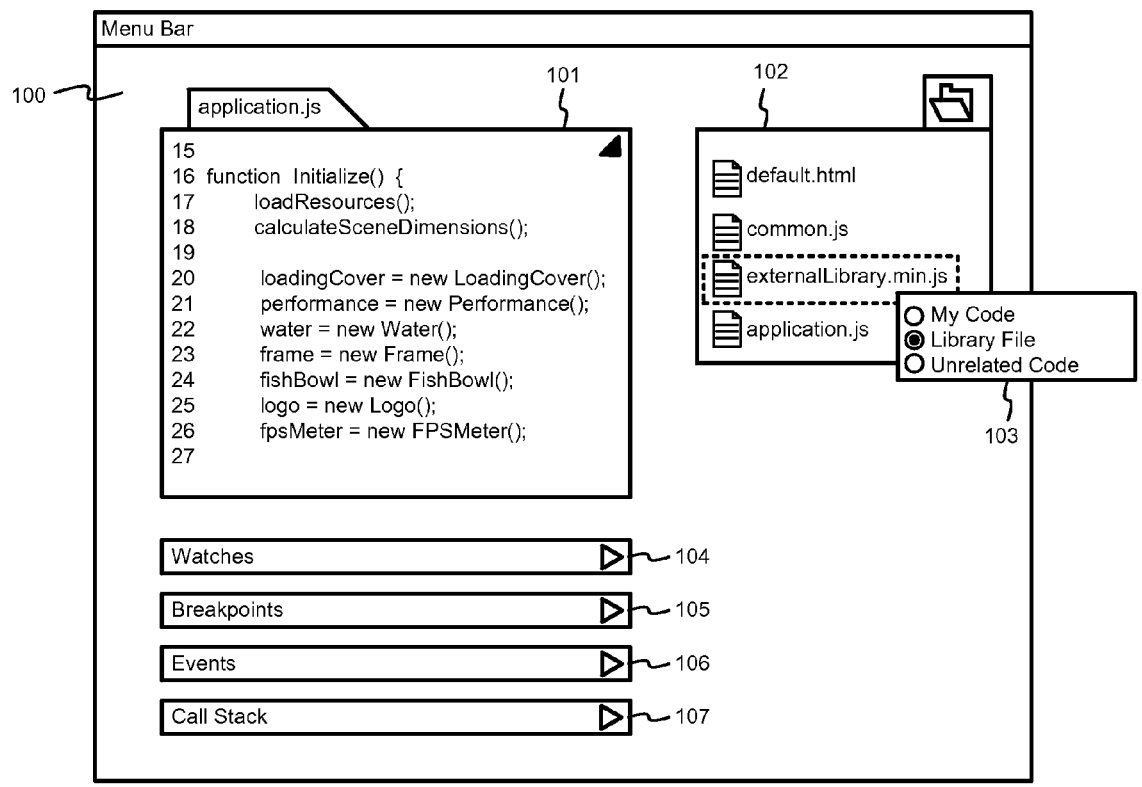
FIG. 1 illustrates a user interface for a debugger tool or integrated development environment application according to an example embodiment.

FIG. 1 illustrates a user interface 100 for a debugger tool or integrated development environment (IDE) application according to an example embodiment. User interface 100 allows developers to select code for debugging and to identify whether the code was created by the developer—i.e., "My Code"—or was from an outside source.

A code window 101 shows lines of code for a selected source file, such as a JAVASCRIPT document. A source documents window 102 shows files that are available for debugging. A developer may select one of the source files using a pointing device, such as a mouse or touch pad, or using menu commands. These files may be code written by the developer, such as the application.js example code shown in code window 101. Libraries, plug-ins and other external files that are being used by the developer, but that were not created by the developer, can also be shown in window 102. For example, rather than recreating an existing feature, the developer may obtain an open-source document with code for that feature and use the open-source document in a new application.

The developer may select files in source documents window 102 and open a code designation window 103, such as by "right-clicking" with a mouse or using menu commands. The developer may designate the selected code as the developer's own code (i.e., "My Code"), as a library file, or as unrelated code by selecting the appropriate option. The file designation is used by the debugger tool or IDE to determine whether to land on or display errors in code for that file.

User interface 100 also provides the developer with other configuration options, such as the ability to set watches, 104, breakpoints 105, or events 106 for the debugger tool. The developer may also view the call stack 107 for selected code.

Figure 2:
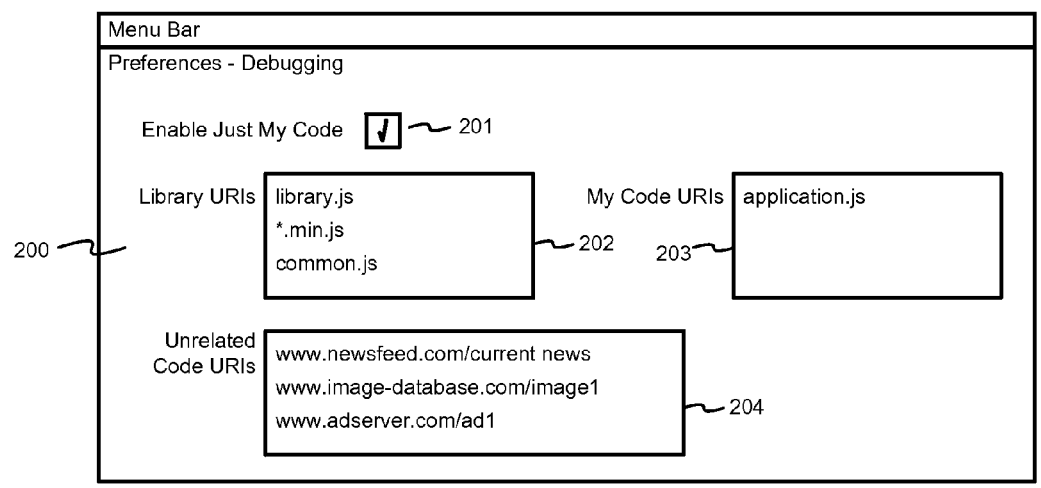
FIG. 2 illustrates a user interface for selecting developer preferences when debugging with a just-my-code feature.

FIG. 2 illustrates a user interface 200 for selecting developer preferences when debugging with a Just My Code feature. The developer may select to limit debugging to files designated as "My Code" using a checkbox 201 or other feature. The developer may designate URIs in window 202 for the debugger tool or IDE to use when identifying "Library Code." A My Code URI window 203 can be used by the developer to specify files that should be considered as "My Code" by the debugger.

User interface 200 allows users to specifically select documents and files that will be considered to be library files (202) and marked as "Library Code," or that will be marked as "My Code" (203), or that will be marked as "Unrelated Code" (204). The files can also be marked by wildcard matching or heuristics. For example, a particular file library.js is specifically designated as a library file, and using the wildcard *.min.js every JAVASCRIPT that has been minified script is also considered to be a library file and would be opted out of "My Code." Unrelated code 204 may include, for example, information provided by external sources, such as a newsfeed, image database, advertisements, or other sources of information displayed in or used by the developer's application.

During debugging of their user script code a developer often inserts breakpoints where they can inspect the test environment to determine whether it is functioning as expected. At the breakpoints, the developer may inspect variables, step to different functions without executing the code in between, edit code and continue execution, review exception handling, etc. When the debugger hits a breakpoint in the debuggee application, the debuggee freezes until execution is restarted by the developer. However, the developer may not want to halt the application within library or open source code because that library or open source code is likely to have been debugged already and, therefore, is likely not the cause of errors in the debuggee application. Instead, the developer wants to see the proximate cause of errors, which likely falls within the developer's own code ("My Code").

Rather than requiring the developer to navigate manually to his or her own code that is causing an error, a debugger using a Just My Code feature will automatically skip over the library and open source code. When the debugger tool encounters an exception that would normally trigger a halt, the debugger evaluate whether the source file constitutes "My Code." If it does not, the debugger will scan the execution stack for the most recent document on the execution stack that matches a "My Code" URI. Once the debugger finds a "My Code" document, it will highlight the relevant line in the debugger (102). If no "My Code" document is found, the document in which the exception occurred may be shown or optionally, the exception may be completely ignored. All other debugger features will behave in the typical way. The debugger will generally not show source code for the library or open source files; however, developers may also opt to inspect "not my code" files by navigating the call stack (107), for example.

Visualization of Program State

The call stack is a key component of how program state is visualized. The call stack presents the developer with the current list of subroutines that have been executed and are pending completion. Without Just My Code, the call stack can become long. This is particularly likely if the call stack visualization supports capturing asynchronous causality chains and/or if the developer is leveraging one or more programming libraries.

In order to assist with orienting the developer and to allow the developer to more rapidly locate code of interest in the call stack, the debugger may modify the visualization of stack frames such that it is clear if the code is "My Code" or not.

Figure 3:
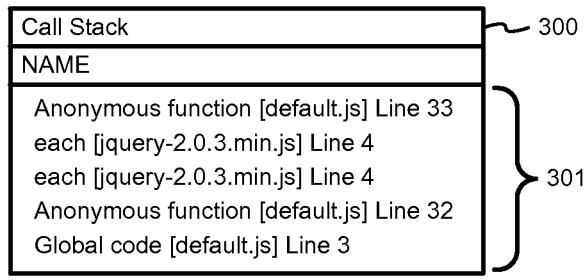
FIG. 3 illustrates a call stack that does not distinguish between "My Code" and other code.

FIG. 3 illustrates how a typical call stack might appear without Just My Code. Call stack configuration 300 displays all of the calls 301 on the stack without distinguishing between "My Code" and other code.

Figure 4:
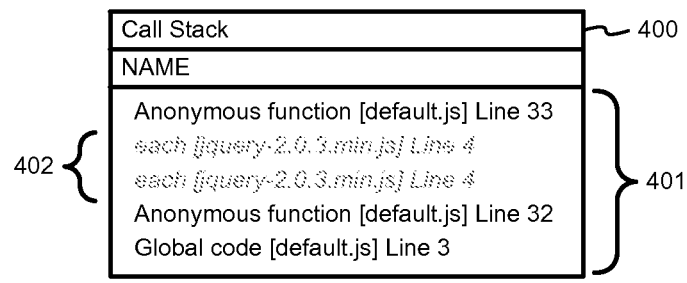
FIG. 4 illustrates an alternative call stack configuration that colorizes stack frames so that frames that are not "My Code" appear differently.

FIG. 4 illustrates an alternative call stack configuration 400 that may be selected by the developer. In call stack configuration 400, the debugger colorizes stack frames so that frames that are not "My Code" appear differently, which indicates to the developer that this code might be less interesting. Call stack configuration 400 displays all of the calls 401 on the stack, but also distinguishes between "My Code" and other code, such as "Library Code" or "Unrelated Code." For example, calls 402 may be associated with library or unrelated code and are visually distinct from the other calls, which are associated with the developer's own code (i.e. "My Code"). The lines designated as "Library Code" or "Unrelated Code" 402 on call stack 400 may be shown in a different font, color, style, or highlight compared to the lines marked as "My Code." Alternatively, call stack 400 may further distinguish between "My Code," "Library Code," and "Unrelated Code" by displaying each in a different visual format, such as using a different color for each type of code.

Figure 5:
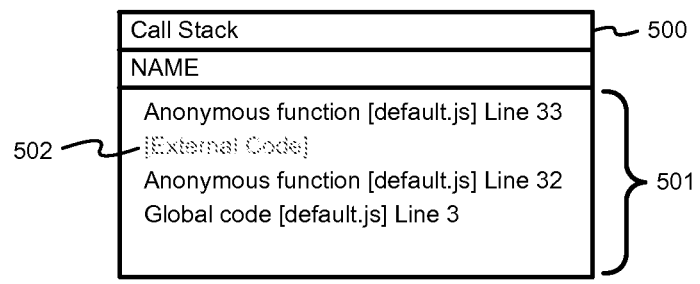
FIG. 5 illustrates a further alternative call stack configuration in which multiple frames are collapsed into a single annotation frame to hide implementation details from the developer.

FIG. 5 illustrates a further alternative to the call stack configuration 500. In this configuration, the debugger has collapsed multiple frames into a single annotation frame labeled "[External Code]" which completely hides implementation details from the developer. Call stack configuration 500 displays calls 501, but only includes the actual details for "My Code." For "Library Code" or "Unrelated Code," call stack configuration 500 collapses the code with the tag "[External Code]" (502). In addition to collapsing the "Library Code" or "Unrelated Code," the [External Code] tag 502 may be shown in a different font, color, style, or highlight compared to the lines marked as "My Code."

The behavior of the debugger may be dependent upon how the code is characterized as "My Code," "Library Code," or "Unrelated Code."

When a program causes an error to be originated, a debugger has two opportunities to intercept the error: (1) when the error is first originated (i.e., a "First-Chance Exception"), and (2) when the debugger determines that the error will cause the program to terminate execution (i.e., an "Unhandled Exception").

First-Chance Exception Handling

Because they tend to be noisy, it is common to disable First-Chance Exception management, particularly in script programs, in which exceptions may be used for feature or behavior detection. For example, the popular JAVASCRIPT library jQuery checks for specific behaviors and, when executed in Internet Explorer 11, will cause two errors to be originated. These errors are handled entirely internally by jQuery, so there is no need for user intervention. However, if first-chance exceptions are enabled in the debugger, standard behavior would be to break at each of these locations.

When Just My Code is enabled and a first-chance exception is encountered, the debugger will inspect the call stack at the point of the exception to determine whether any code classified as "My Code" is on the stack. If there is no "My Code" on the call stack, then the debugger will simply continue execution and will silently ignore the first-chance exception. If there is code labeled as "My Code" on the call stack, then the debugger will break execution and will cause the "My Code" document to appear in the debugger window. The debugger will further highlight the program statement that led to the exception occurring. Without Just My Code, the debugger would react the same way in both of these scenarios and would break execution at the line of code that is not "My Code" and that most immediately led to the error being originated.

Unhandled Exception Handling

When a debugger determines that an error will cause a program to terminate execution (an "Unhandled Exception"), most debuggers will cause the program to break execution and pause at the offending line of code. However, if the error occurs within code that does not belong to the application developer, such as within a utility library ("Library Code"), breaking execution does not particularly help the developer solve the problem because the developer did not author that library. To address this issue, the debugger may incorporate the following behaviors:

The debugger will not break in "Unrelated Code," when "My Code" is not on the call stack. The principle behind this behavior is that the code currently executing will not cause the application to be forcibly terminated. For example, the code may be contained within an advertisement or other isolated, non-critical container. Given the context of this code, it would be not be helpful to inform the developer about the problem, because the developer likely did not author that code and/or does not have access to the code.

When "My Code" is on the call stack, the debugger will always break execution there. The principle behind this behavior is that it is always more helpful to break execution within "My Code" instead of "Library Code," because the application developer authored "My Code" but likely not the "Library Code."

When "Library Code" is on the call stack, but "My Code" is not on the call stack, the debugger will break execution within "Library Code". The principle here assumes that the developer is using Library Code and, if an error in Library Code is going to cause the program's execution to be terminated, it is likely because the developer did something incorrectly.

Without Just My Code, any unhandled exception would always cause the debugger to break execution at the topmost frame of the call stack (assuming the debugger is configured to break upon unhandled exceptions). Using the behaviors outlined above, Just My Code helps eliminate noise, and the debugger brings the developer to locations for problems that are more readily actionable.

Behavior of the Debugger at Explicit User Breakpoints

The developer may insert a breakpoint in code using, for example, a graphical user interface on the IDE or a particular programming statement supported by the programming language. When a program encounters an explicit user breakpoint, the debugger should evaluate whether the current code is "Unrelated Code." If the code is "Unrelated Code," then the debugger should bypass the breakpoint. Otherwise, the debugger should break execution. Without this behavior, script documents that include debugging statements from other sources would cause the debugger to break execution. This is an unactionable behavior and only serves to create more noise for the developer.

Behavior of the Debugger when the User Requests a Break On Next Statement

Because script code generally does not continuously execute, a common debugger feature is "Break On Next Statement." This feature causes the debugger to break execution immediately before the next line of code executes. When Just My Code is enabled, the debugger evaluates whether the first line of code encountered is "My Code" and, if "My Code" is identified, the debugger will break execution. Otherwise, the debugger continues executing the script code until either (1) "My Code" is encountered, at which point the debugger should break execution, or (2) script execution yields back to its host (i.e., no more script instructions are available) at which point the debugger will again behave as if "Break on Next Statement" was invoked.

Without Just My Code, when "Break On Next Statement" is requested, the debugger would simply break execution upon the first instruction being executed. However, this may not be the developer's code and, therefore, would not be helpful in solving a problem.

Figure 6:
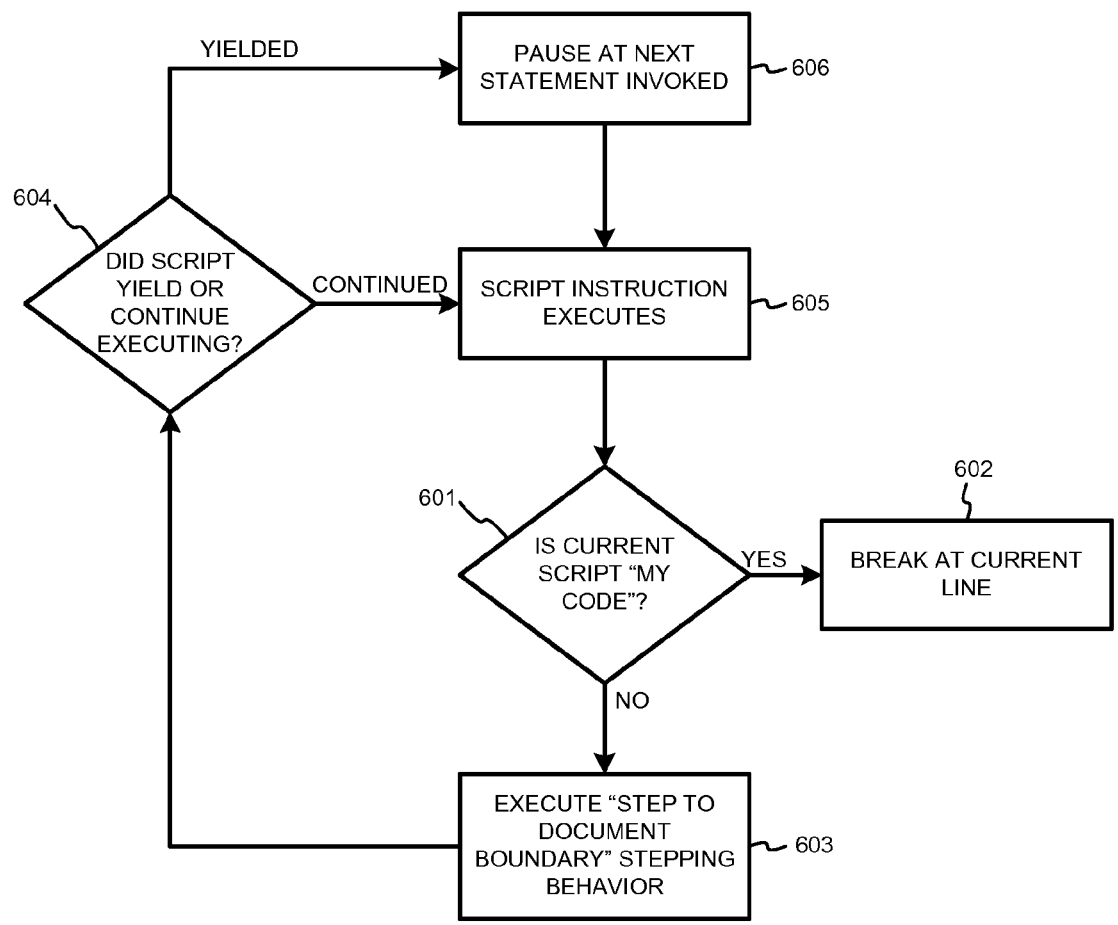
FIG. 6 is a flowchart illustrating a "Break On Next Statement" algorithm according to one embodiment.

FIG. 6 is a flowchart illustrating a "Break On Next Statement" algorithm according to one embodiment. At step 601, the debugger evaluates whether the current script is "My Code." If the current script is designated as "My Code," then the debugger breaks execution of the script at step 602. If the current script is not designated as "My Code," then the debugger executes "Step To Document Boundary" behavior in step 603.

The debugger then evaluates whether the script yielded or continued executing in step 604. If the script has continued executing, then the script instruction executes in step 605. The debugger then evaluates whether the now-current script is "My Code" in step 601.

If the script has yielded at step 604, then the debugger pauses at the next statement invoked in step 605. That next statement may then execute in step 605 when allowed by the debugger or user.

Behavior of the Debugger when the User Executes a Stepping Gesture

"Stepping" is a debugger gesture in which the user requests that the debugger permit the program to execute some incremental amount of code prior to returning control and breaking execution again. Common stepping patterns for debugging are "Step In/Next," "Step Over," and "Step Out," which identify the relationship of the current programming language's scope to expected functional behavior. "Step In" breaks at the absolute next line of program execution. "Step Over" steps to the next line of the current routine, bypassing subexpression evaluation. "Step Out" steps over all subsequent lines of the current routine.

In order to support debugging of "My Code" efficiently for JAVASCRIPT, a "Step To Document Boundary" behavior may be used to tell the script engine to continue running until it leaves the current document. This functionality may exist in the other direction as well; if a user chooses to "Step Out" of a function call, the calling function may not have been "My Code," at which point the user should land at the first "My Code" document instruction in the call stack below the currently-executing function. If no "My Code" document exists at this point, execution should resume normally. This has the effect of hiding code that the developer did not create and does not care about during debugging. The "Step To Document Boundary" behavior is further described in pending U.S. patent application Ser. No. 13/831,801 for "JAVASCRIPT Debugging using Just My Code," which was filed Mar. 15, 2013, the disclosure of which is hereby incorporated in its entirety herein.

Without Just My Code, it is common for developers to enter unexpected subexpression evaluations when executing a stepping gesture. For example, when accessing a property, the developer may be unable to determine if it is an accessor property or a data property. If the property is an accessor property, a Step In instruction would result in actually executing the code contained within the accessor. However, this is typically not the action that the developer intends.

Whenever a Step instruction completes, the debugger will evaluate whether it has landed within a "My Code" document. If it has not landed in a "My Code" document, the debugger will continue execution of the program until it does land in "My Code." If it is available, a "Step to Document Boundary" stepping instruction is the most efficient mechanism to execute this behavior. If a "Step to Document Boundary" behavior is not available in the debugger, this may be implemented in terms of the same Step instruction that was initially used (i.e., Step In or Step Out). In cases where a Step In or Step Over implicitly becomes a Step Out because the step was executed at the end of a function, the stepping behavior should be treated as a Step Out.

Notwithstanding how the stepping is handled, if a user has explicitly set a breakpoint within "Library Code," Just My Code stepping behaviors are disabled while the stepping gestures originate within "Library Code." If the user has explicitly chosen to debug "Library Code," the debugger should assume that is desired until "Library Code" is exited.

These debugger behaviors may be used with the visualization illustrated in FIGS. 3-5 or in visualizations that do something other than simply displaying the call stack. For example, the visualizations may be used to categorize memory consumption due to code originating with the developer ("My Code") instead of code strictly originating within libraries ("Library Code").

Figure 7:
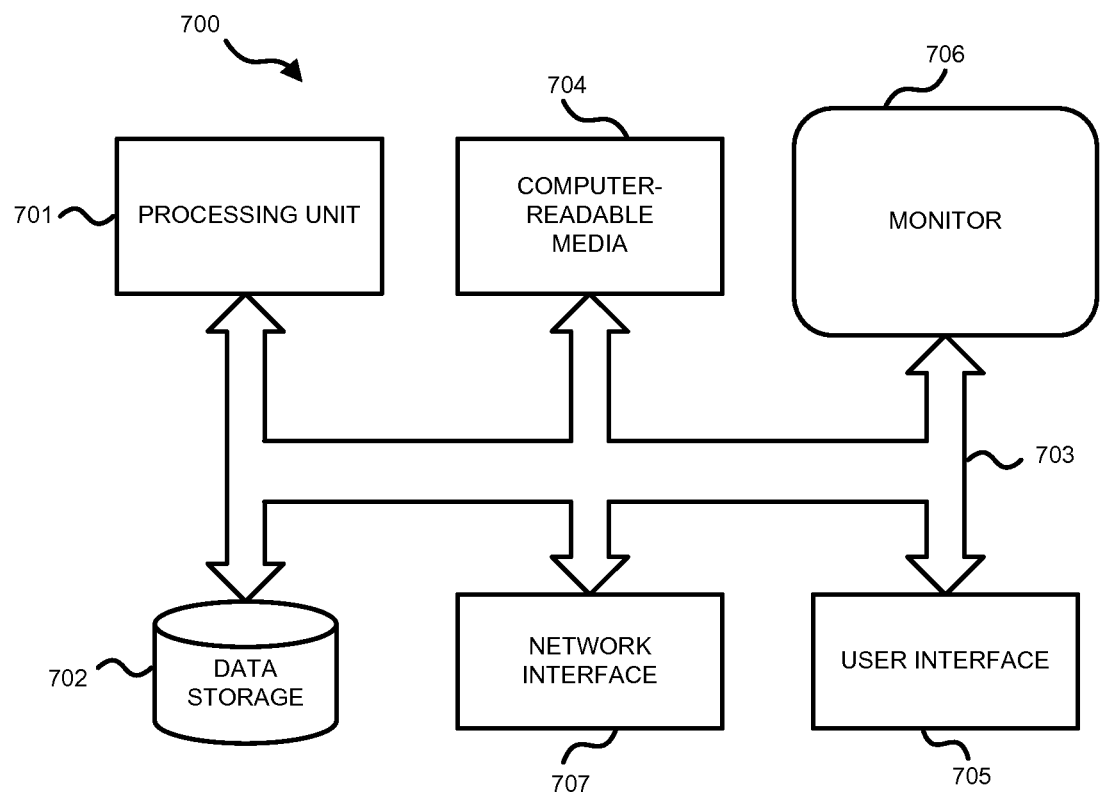
FIG. 7 illustrates an example of a suitable computing and networking environment for a JAVASCRIPT debugging using a just-my-code feature.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, various hardware components, such as processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Processing unit 701 may run developer and debugging tools, such as an IDE, JAVASCRIPT editor, or browser, for implementing aspects of the invention described herein.

The computer 700 typically includes a variety of computer-readable media 704. Computer-readable media 704 may be any available media that can be accessed by the computer 700 and includes both volatile and nonvolatile media, and removable and non-removable media, but excludes propagated signals. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

Data storage 702 and computer-readable media 704 may hold software applications for developing and debugging JAVASCRIPT applications, such as an IDE, JAVASCRIPT editor or browser. Additionally, data storage 702 and computer-readable media 704 may hold JAVASCRIPT files, such as developer generated code (i.e., "my code") and library, open source, third-party, and other code (i.e., "not my code"). Files in other programming languages, such as TypeScript, CoffeeScript, or Dart, may also be stored.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 701 through a user input interface 705 that is coupled to the system bus 703, but may be connected by other interface and bus structures, such as a parallel port, game port or a universal serial bus (USB). User interface 705 may provide a developer with tools for identifying sections of JavaScript JAVASCRIPT code as "my code" or "not my code."

A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked or cloud-computing environment using logical connections 707 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 700 may be connected to a public or private network through a network interface or adapter 707. In some embodiments, a modem or other means for establishing communications over the network. The modem, which may be internal or external, may be connected to the system bus 703 via the network interface 707 or other appropriate mechanism. A wireless networking component such as comprising an interface and antenna may be coupled through a suitable device such as an access point or peer computer to a network. In a networked environment, program modules depicted relative to the computer 700, or portions thereof, may be stored in the remote memory storage device. It may be appreciated that the network connections shown are exemplary and other means of establishing a communications link between the computers may be used.

Network interface 707 may also be used to provide access to software and code running on a remote computer or terminal so that a developer using system 700 can debug the code running on the remote device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for debugging JAVASCRIPT code located in one or more code sources and other code that is compiled into JAVASCRIPT code in a computer system configured for debugging software, the method comprising:
    providing a display allowing the designation of a JAVASCRIPT code source file as one of developer code, library code, and unrelated code;
    identify when an explicit user breakpoint occurs in the execution of the JAVASCRIPT code;
    determining whether code present on a call stack when the unhandled exception error occurs in a code present in a JAVASCRIPT code source file designated as developer code, library code, or unrelated code;
    if developer code or library code is present on the call stack, break execution of the JAVASCRIPT code at the user breakpoint; and
    if unrelated code is present on the call stack, ignore the user breakpoint and continuing execution of the JAVASCRIPT code; and
    performing debugging operations on the JAVASCRIPT code, wherein exception handling is determined based upon the designation of the JAVASCRIPT code source file associated with the exception.

2. The method of claim 1, further comprising:
    identifying when a first-chance exception error occurs in the execution of the JAVASCRIPT code; and
    determining whether code present on a call stack when the first-chance exception error occurs is developer code, library code, or unrelated code.

3. The method of claim 2, further comprising:
    if developer code is present on the call stack, breaking execution of the JAVASCRIPT code; and
    displaying the developer code identified in the call stack to a user.

4. The method of claim 3, further comprising:
    highlighting a program statement in the displayed code, wherein the highlighted program statement resulted in the first-chance exception error.

5. The method of claim 2, further comprising:
    if only library code or unrelated code is present on the call stack, ignoring the first-chance exception error and continuing execution of the JAVASCRIPT code.

6. The method of claim 1, further comprising:
    identifying when an unhandled exception error occurs in the execution of the JAVASCRIPT code; and
    determining whether code present on a call stack when the unhandled exception error occurs is developer code, library code, or unrelated code.

7. The method of claim 6, further comprising:
    if developer code is present on the call stack, breaking execution of the JAVASCRIPT code; and displaying the developer code identified in the call stack to a user.

8. The method of claim 6, further comprising:
if library code is present on the call stack, ignoring the unhandled exception error and continuing execution of the JAVASCRIPT code.

9. The method of claim 6, further comprising:
if unrelated code is present on the call stack, ignoring the unhandled exception error and continuing execution of the JAVASCRIPT code.

10. The method of claim 1, further comprising:
identifying when an explicit user breakpoint occurs in the execution of the JAVASCRIPT code; and
determining whether code present on a call stack when the unhandled exception error occurs is developer code, library code, or unrelated code.

11. The method of claim 10, further comprising:
if developer code is present on the call stack, breaking execution of the JAVASCRIPT code at the user breakpoint; and
displaying the developer code identified in the call stack developer code to a user.

12. The method of claim 10, further comprising:
if only unrelated code or library code is present on the call stack, ignoring the user breakpoint and continuing execution of the JAVASCRIPT code.

13. The method of claim 1, further comprising:
identifying when a debugger is configured to break on next statement;
breaking execution if a next line of code in JAVASCRIPT code is developer code; and
continuing execution of the JAVASCRIPT code if a next line of code is library code or unrelated code.

14. The method of claim 1, further comprising:
performing a stepping action by a debugger, the stepping action executing a next code statement;
after executing the next code statement, determining whether the debugger has landed in developer code, library code, or unrelated code;
breaking execution if the debugger landed in developer code after the stepping action; and
if the debugger landed in library code or unrelated code, continuing the stepping action until the debugger lands in developer code.

15. The method of claim 1, further comprising:
performing a stepping action by a debugger, the stepping action executing a next code statement by a script engine; and
if the executed statement is library code or unrelated, instructing the script engine to step to a document boundary.

16. A computer system including a debugger configured to perform one or more debugging operations on JAVASCRIPT code located in one or more code sources, the system comprising:
a central processing unit;
a first memory hardware coupled to the central processing unit, the memory having program instructions stored thereon that, upon execution by the central processing unit, cause the system to:
provide a display allowing the designation of a JAVASCRIPT code source file as one of developer code, library code, and unrelated code;
identify when an explicit user breakpoint occurs in the execution of the JAVASCRIPT code;
determine whether code present on a call stack when the unhandled exception error occurs in a code present in a JAVASCRIPT code source file designated as developer code, library code, or unrelated code;
if developer code or library code is present on the call stack, break execution of the JAVASCRIPT code at the user breakpoint; and
if unrelated code is present on the call stack, ignore the user breakpoint and continuing execution of the JAVASCRIPT code; and
perform debugging operations on the JAVASCRIPT code, wherein exception handling is determined based upon the designation of the JAVASCRIPT code source file associated with the exception.

17. The computer system of claim 16, the debugger further operating to:
identify when a first-chance exception error occurs in the execution of the JAVASCRIPT code;
determine whether code present on a call stack when the first-chance exception error occurs is developer code, library code, or unrelated code;
if developer code is present on the call stack, breaking execution of the JAVASCRIPT code; and
if library code or unrelated code is present on the call stack, ignoring the first-chance exception error and continuing execution of the JAVASCRIPT code.

18. The computer system of claim 16, the debugger further operating to:
identify when an unhandled exception error occurs in the execution of the JAVASCRIPT code;
determine whether code present on a call stack when the unhandled exception error occurs is developer code, library code, or unrelated code;
if developer code is present on the call stack, breaking execution of the JAVASCRIPT code;
if library code is present on the call stack, breaking execution of the JAVASCRIPT code within the library code; and
if unrelated code is present on the call stack, ignoring the unhandled exception error and continuing execution of the JAVASCRIPT code.

19. The computer system of claim 16, the debugger further operating to:
perform a stepping action by a debugger, the stepping action executing a next code statement;
after executing the next code statement, determining whether the debugger has landed in developer code, library code, or unrelated code;
breaking execution if the debugger landed in developer code after the stepping action; and
if the debugger landed in library code or unrelated code, continuing the stepping action until the debugger lands in developer code.

20. A hardware device comprising one or more computer-readable storage medium storing computer-executable instructions that when executed by at least one processor of the device cause the at least one processor to perform instructions for debugging JAVASCRIPT code located in one or more code sources, the instructions causing the device to:
designate JAVASCRIPT code source files as one of developer code, library code, and unrelated code;
identify when an explicit user breakpoint occurs in the execution of the JAVASCRIPT code;
determine whether code present on a call stack when the unhandled exception error occurs in a code present in a JAVASCRIPT code source file designated as developer code, library code, or unrelated code;

if developer code or library code is present on the call stack, break execution of the JAVASCRIPT code at the user breakpoint; and if unrelated code is present on the call stack, ignore the user breakpoint and continuing execution of the JAVASCRIPT code.

\* \* \* \* \*